United States Patent
Putz

(10) Patent No.: US 8,925,604 B2
(45) Date of Patent: Jan. 6, 2015

(54) TAKE-APART VEHICLE WHEEL ASSEMBLY, SEAL FOR USE IN SUCH A WHEEL ASSEMBLY, AND METHOD FOR PRODUCING SUCH A WHEEL ASSEMBLY

(75) Inventor: Christopher A. Putz, Canton, MI (US)

(73) Assignee: Hayes Lemmerz International, Inc., Northville, MI (US)

( * ) Notice: Subject to any disclaimer, the term of this patent is extended or adjusted under 35 U.S.C. 154(b) by 379 days.

(21) Appl. No.: 13/338,564

(22) Filed: Dec. 28, 2011

(65) Prior Publication Data

US 2013/0169028 A1 Jul. 4, 2013

(51) Int. Cl.
*B60B 25/22* (2006.01)

(52) U.S. Cl.
USPC .............. 152/405; 152/DIG. 10; 301/64.305; 301/64.306

(58) Field of Classification Search
CPC ............ B60B 25/22; B60B 3/08; B60B 3/087
USPC .......... 152/396, 402, 403, 404, 405, DIG. 10; 301/63.102, 64.201, 64.202, 64.203, 301/64.301, 64.302, 64.303, 64.305, 64.306
See application file for complete search history.

(56) References Cited

U.S. PATENT DOCUMENTS

| | | | | |
|---|---|---|---|---|
| 2,905,223 | A * | 9/1959 | Quayle | ......................... 152/404 |
| 3,865,170 | A * | 2/1975 | Mitchell | ......................... 152/386 |
| 3,880,219 | A | 4/1975 | Mitchell | |
| 4,836,261 | A | 6/1989 | Weeks et al. | |
| 5,022,450 | A | 6/1991 | Weeks | |
| 5,215,137 | A | 6/1993 | Weeks et al. | |
| 6,315,366 | B1 | 11/2001 | Post et al. | |
| 7,779,877 | B2 | 8/2010 | Putz et al. | |
| 2003/0080609 | A1 | 5/2003 | Darnell | |
| 2007/0290549 | A1 * | 12/2007 | Zabaleta | ..................... 301/95.11 |

FOREIGN PATENT DOCUMENTS

| | | | |
|---|---|---|---|
| DE | 2414387 | C3 * | 4/1978 |
| DE | 8909900 | U1 | 10/1989 |
| FR | 2192006 | A1 | 2/1974 |
| GB | 792233 | A | 3/1958 |
| GB | 1363160 | A * | 8/1974 |

OTHER PUBLICATIONS

Extended European Search Report, Application No. EP 12199700.1 dated Apr. 9, 2013.

* cited by examiner

*Primary Examiner* — Kip T Kotter
(74) *Attorney, Agent, or Firm* — MacMillan, Sobanski & Todd, LLC

(57) ABSTRACT

A take-apart vehicle wheel assembly includes an inner wheel part defining an axis and including a generally radially extending annular flange having an outboard surface; an outer wheel part configured to be secured to the inner wheel part, the outer wheel part including a generally radially extending annular flange having an inboard surface; a gap defined between the outboard surface of the inner wheel part and the inboard surface of the outer wheel part in an area adjacently surrounding each of a plurality of stud receiving holes formed in the inner and outer wheel parts; and a seal disposed in the gap; wherein the gap is formed by providing a recess in at least one of the outboard surface of the inner wheel part and the inboard surface of the outer wheel part in at least a portion of the area adjacently surrounding each of the plurality of stud receiving holes formed therein.

25 Claims, 13 Drawing Sheets

TAKE-APART VEHICLE WHEEL ASSEMBLY, SEAL FOR USE IN SUCH A WHEEL ASSEMBLY, AND METHOD FOR PRODUCING SUCH A WHEEL ASSEMBLY

BACKGROUND OF THE INVENTION

The present invention relates generally to vehicle wheel assemblies and in particular to an improved take-apart vehicle wheel assembly, seal for use in such a wheel assembly, and method for producing such a wheel assembly.

U.S. Pat. No. 6,315,366 to Post et al. discloses one kind or type of a prior art take-apart or multi-piece vehicle wheel assembly. As shown in the Post et al. patent, the prior art take-apart vehicle wheel assembly includes an inner rim, an outer rim, and a wheel mounting disc. The wheel mounting disc includes an outer cylindrical surface and is welded to the inner rim. Threaded stud bolts extend through apertures formed through the wheel mounting disc and the outer rim. Nuts are installed on and tightened on the stud bolts to secure the outer rim to the wheel mounting disc.

As further shown in the embodiment of FIG. 1 in the Post et al. patent, the outboard tire bead seat surface of the inner rim terminates at a chamfered surface. When the take-apart vehicle wheel assembly is assembled, a generally equilateral triangle shaped cavity is defined between an inner surface of the outer rim, the chamfered surface of the inner rim, and the outer cylindrical surface of the disc. An elastomeric seal is disposed in the triangular shaped cavity and is compressed between the opposing surfaces of the wheel assembly to prevent air leakage. When the nuts on the threaded stud bolts are loosened, air can move past the elastomeric seal prior to the nuts being removed from the studs. Other examples of prior art take-apart vehicle wheel assemblies having an elastomeric seal disposed in opposing surfaces of parts or components thereof are disclosed in U.S. Pat. No. 7,779,877 to Putz et al., U.S. Pat. No. 6,315,366 to Post et al., U.S. Pat. No. 5,215,137 to Weeks et al., U.S. Pat. No. 5,022,450 to Weeks, and U.S. Pat. No. 4,836,261 to Weeks et al.

SUMMARY OF THE INVENTION

The present invention relates to a take-apart vehicle wheel assembly, seal for use in such a wheel assembly, and method for producing such a wheel assembly. According to one embodiment, the take-apart vehicle wheel assembly comprises: an inner wheel part defining an axis and including a generally radially extending annular flange having an outboard surface, the radially extending annular flange of the inner wheel part having a plurality of stud receiving holes formed therein; an outer wheel part configured to be secured to the inner wheel part, the outer wheel part including a generally radially extending annular flange having an inboard surface, the radially extending annular flange of the outer wheel part having a plurality of stud receiving holes formed therein; a gap defined between the outboard surface of the inner wheel part and the inboard surface of the outer wheel part in an area adjacently surrounding each of the plurality of stud receiving holes formed therein; and a seal disposed in the gap whereby when the inner wheel part and the outer wheel part are secured together using studs and nuts the seal is operative to produce a seal between the inner wheel part and the outer wheel part; wherein the gap is formed by providing a recess in at least one of the outboard surface of the inner wheel part and the inboard surface of the outer wheel part in at least a portion of the area adjacently surrounding each of the plurality of stud receiving holes formed therein.

According to another embodiment, the take-apart vehicle wheel assembly comprises: an inner wheel part defining an axis and including a generally radially extending annular flange having an outboard surface, the radially extending annular flange of the inner wheel part having a plurality of stud receiving holes formed therein; an outer wheel part configured to be secured to the inner wheel part, the outer wheel part including a generally radially extending annular flange having an inboard surface, the radially extending annular flange of the outer wheel part having a plurality of stud receiving holes formed therein; a gap defined between the outboard surface of the inner wheel part and the inboard surface of the outer wheel part in an area adjacently surrounding each of the plurality of stud receiving holes formed therein; a seal disposed in the gap whereby when the inner wheel part and the outer wheel part are secured together the seal is operative to produce a seal between the inner wheel part and the outer wheel part, the seal provided with a plurality of openings formed therein; and a stud extending through a respective one of each of the plurality of stud receiving holes formed in the inner wheel part and the outer wheel part and through a respective one of each of the plurality of openings provided in the seal and having nuts installed thereon to secure the inner wheel part and the outer wheel part together with the seal disposed in the gap; wherein the gap is formed by providing a recess in at least one of the outboard surface of the inner wheel part and the inboard surface of the outer wheel part in at least a portion of the area adjacently surrounding each of the plurality of stud receiving holes formed therein.

According to another embodiment, a seal adapted for use in a take-apart vehicle wheel assembly comprises: an annular and continuous seal formed from a suitable material and including an outer peripheral surface, an inner peripheral surface, and a plurality of openings formed therein, wherein the seal is generally flat and defines a predetermined thickness. Additionally, the seal can be formed from a generally compressible material and can include at least one generally non-compressible member secured thereto.

According to still yet another embodiment, a method for producing a take-apart vehicle wheel assembly comprises the steps of: (a) providing an inner wheel part defining an axis and including a generally radially extending annular flange having an outboard surface, the radially extending annular flange of the inner wheel part having a plurality of stud receiving holes formed therein; (b) providing an outer wheel part configured to be secured to the inner wheel part, the outer wheel part including a generally radially extending annular flange having an inboard surface, the radially extending annular flange of the outer wheel part having a plurality of stud receiving holes formed therein; (c) providing a seal adapted to be disposed in a gap defined between the outboard surface of the inner wheel part and the inboard surface of the outer wheel part in an area adjacently surrounding each of the plurality of stud receiving holes formed therein, the seal provided with a plurality of openings formed therein; (d) positioning the inner wheel part and the outer wheel part adjacent to each other to define the gap; (e) positioning the seal in the gap; and (f) securing the inner wheel part and the outer wheel part together by installing a stud which extends through a respective one of each of the plurality of stud receiving holes formed in the inner wheel part and the outer wheel part and through a respective one of each of the plurality of openings provided in the seal and installing a nut on each of the studs to thereby secure the inner wheel part and the outer wheel part together with the seal disposed in the gap thereby producing a seal between the inner wheel part and the outer wheel part.

Other advantages of this invention will become apparent to those skilled in the art from the following detailed description of the invention and preferred embodiments, when read in light of the accompanying drawings.

DETAILED DESCRIPTION OF THE INVENTION

Figure 1:
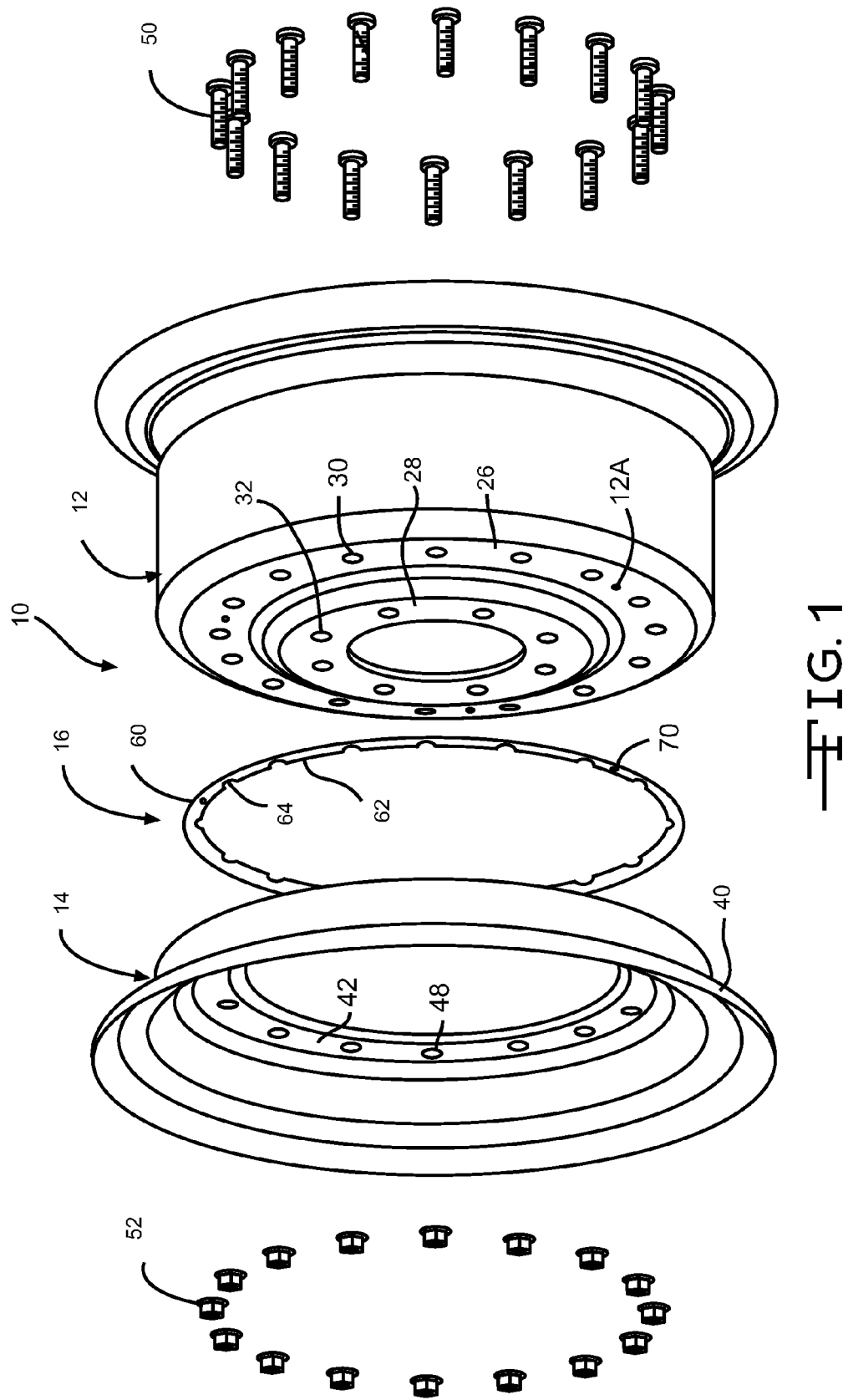
FIG. 1 is an exploded view of a first embodiment of a take-apart vehicle wheel assembly constructed in accordance with this invention.
Figure 1A:
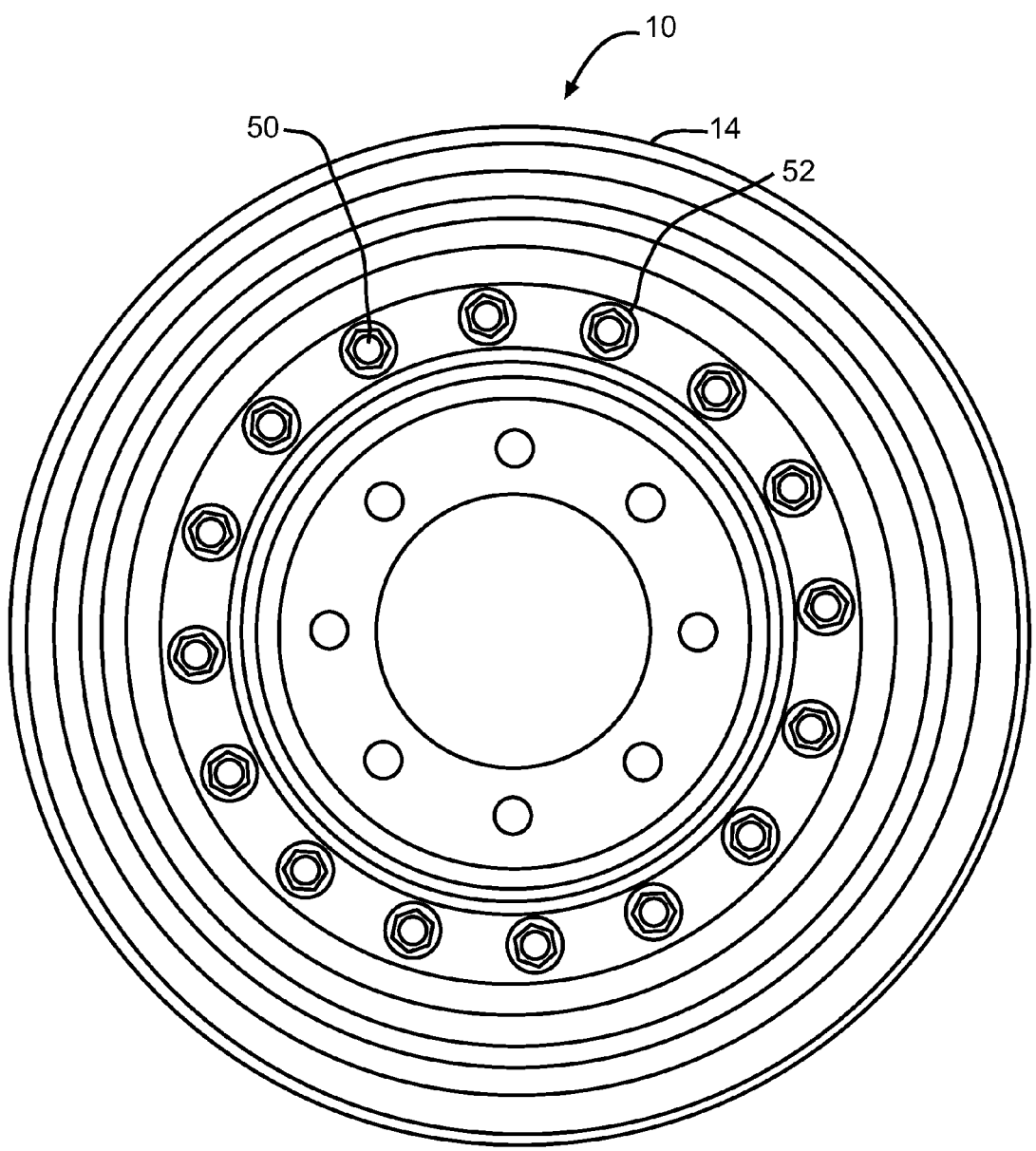
FIG. 1A is a plan view of the assembled take-apart vehicle wheel assembly illustrated in FIG. 1.
Figure 2:
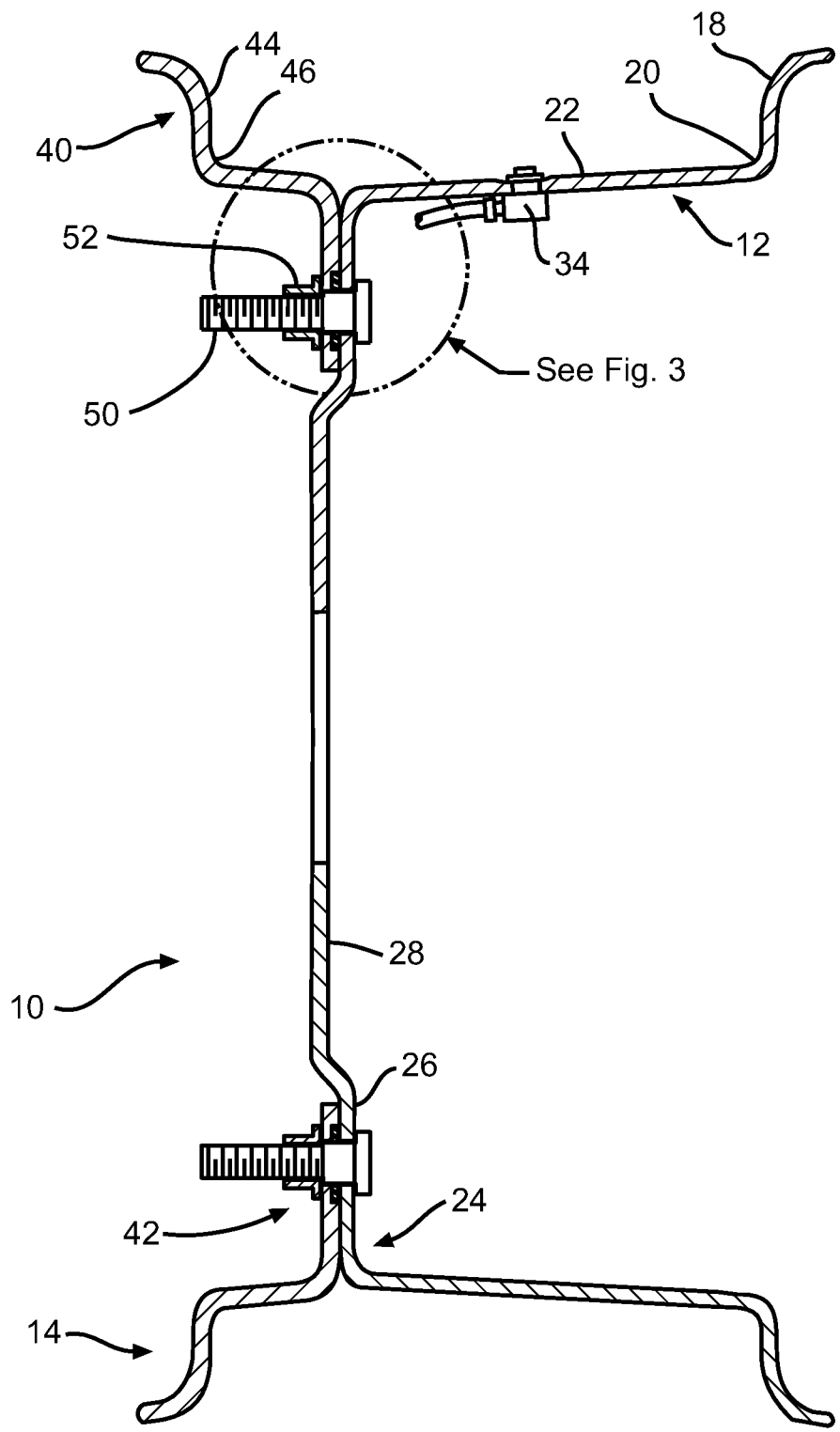
FIG. 2 is a sectional view of the take-apart vehicle wheel assembly illustrated in FIG. 2.

Referring now to the drawings, there is illustrated in FIGS. 1 and 2 a first embodiment of a take-apart vehicle wheel assembly, indicated generally at 10, and constructed in accordance with the present invention. Although the following embodiments of the invention will be described and illustrated in conjunction with the particular take-apart vehicle wheel constructions disclosed herein, it will be appreciated that the embodiments of the invention can be used in conjunction with other types of take-apart vehicle wheel constructions. For example, the invention can be used in connection with other kinds or types of take-apart or multi-piece vehicle wheel assembly constructions, including, two, three or more "individual" wheel component parts or pieces, and/or such as for example as shown in U.S. Pat. No. 7,779,877 to Putz et al., in U.S. Pat. No. 6,315,366 to Post et al., in U.S. Pat. No. 5,215,137 to Weeks et al., in U.S. Pat. No. 5,022,450 to Weeks, and in U.S. Pat. No. 4,836,261 to Weeks et al., the disclosures of each of these patents incorporated by reference in entirety herein.

Also, as used herein, the term individual wheel component parts or pieces refers to the actual total number of individual wheel component parts or pieces which are used in assembling the take-apart vehicle wheel assembly and not the actual number of pieces you would "hold in your hand". As such, all take-apart vehicle wheel assemblies are of a two piece construction or design, meaning that you literally hold two pieces in your hand and assemble them together, typically with mounting studs and nuts, to produce the take-apart vehicle wheel assembly. Thus, this two piece design can include a one piece inner or first wheel part (single piece with no weld) and a one piece outer or second wheel part (single piece with no weld) which are assembled together to produce the take-apart vehicle wheel assembly (two pieces total); an inner or first wheel part (typically two pieces welded together) and an outer or second wheel part (typically two pieces welded together) which are assembled together to produce the take-apart vehicle wheel assembly (four pieces total); and/or any combination thereof of the above inner or first wheel part and outer or second wheel part (two, three, four or more total pieces).

In the illustrated embodiment, the take-apart vehicle wheel assembly 10 includes an inner "rim" or first wheel part 12, an outer "disc" or second wheel part 14, and a gasket or "mechanical" seal 16. The inner wheel part 12 is preferably fabricated from steel, aluminum, or other alloy materials and defines an axis X. As shown in FIG. 2, the inner wheel part 12 includes an inboard tire retaining flange 18, an inboard tire bead seat 20, and a generally axially extending well 22. Alternatively, the construction of the inner wheel part 12 can be other than illustrated and described if so desired.

In the illustrated embodiment, the inner wheel part 12 further includes a generally radially inwardly extending portion, indicated generally at 24. The radially inwardly extending portion 24 includes an inner annular flange 26 and an inner mounting surface 28. The inner annular flange 26 includes a plurality of stud receiving holes 30 formed therethrough. In the illustrated embodiment, the take-apart vehicle wheel assembly 10 is provided with sixteen (16) stud receiving holes 30 formed in the inner annular flange 26 thereof.

The inner mounting surface 28 of the inner wheel part 12 includes a plurality of wheel mounting stud receiving holes 32 formed therethrough. In the illustrated embodiment, the take-apart vehicle wheel assembly 10 is provided with eight (8) wheel mounting stud receiving holes 32 formed in the inner mounting surface 28 thereof. The wheel mounting stud receiving holes 32 are adapted to receive lug bolts and nuts (not shown) for securing the take-apart vehicle wheel assembly 10 on an axle (not shown) of a vehicle.

In the illustrated embodiment, a conventional inflation valve 34 (shown in FIG. 2), extends through and is mounted to the inner wheel part 12. The inflation valve 34 is provided with an associated valve insert for the inflation of the take-apart vehicle wheel assembly 10. Alternatively, the construction of the inner wheel part 12 can be other than illustrated and described if so desired. For example, the inner wheel part 12 can be provided with any suitable number of stud receiving holes 30 formed therein, such as for example, typically any even number of stud receiving holes between twelve (24) and twenty-four (24), if so desired, and/or the number of the wheel mounting stud receiving holes 32 can be other than illustrated if so desired.

In the illustrated embodiment, the outer wheel part 14 is preferably fabricated from steel, aluminum, magnesium, titanium, or other alloy materials and includes an outer annular flange 40 and a generally radially inwardly extending inner annular flange 42. As shown in FIG. 2, the outer annular flange 40 of the outer wheel part 14 defines an outboard tire retaining flange 44 and an outboard tire bead seat 46 of the take-apart wheel assembly 10. The outer wheel part 14 includes a plurality of stud receiving holes 48 formed therein. In the illustrated embodiment, the take-apart vehicle wheel assembly 10 is provided with sixteen (16) stud receiving holes 48 formed in the inner annular flange 42 thereof. As can be understood for assembly purposes, the number and spacing of the stud receiving holes 30 provided in the inner annular flange 26 of the inner wheel part 12 corresponds to the number and spacing of the stud receiving holes 48 provided in the inner annular flange 42 of the outer wheel part 14. As will be discussed, below, thus enables studs 50 to be inserted through the aligned holes 30 and 48 and nuts 52 installed thereon and tightened to secure the inner wheel part 12 and the outer wheel part 14 together and produce the take-apart vehicle wheel assembly 10.

Figure 2C:
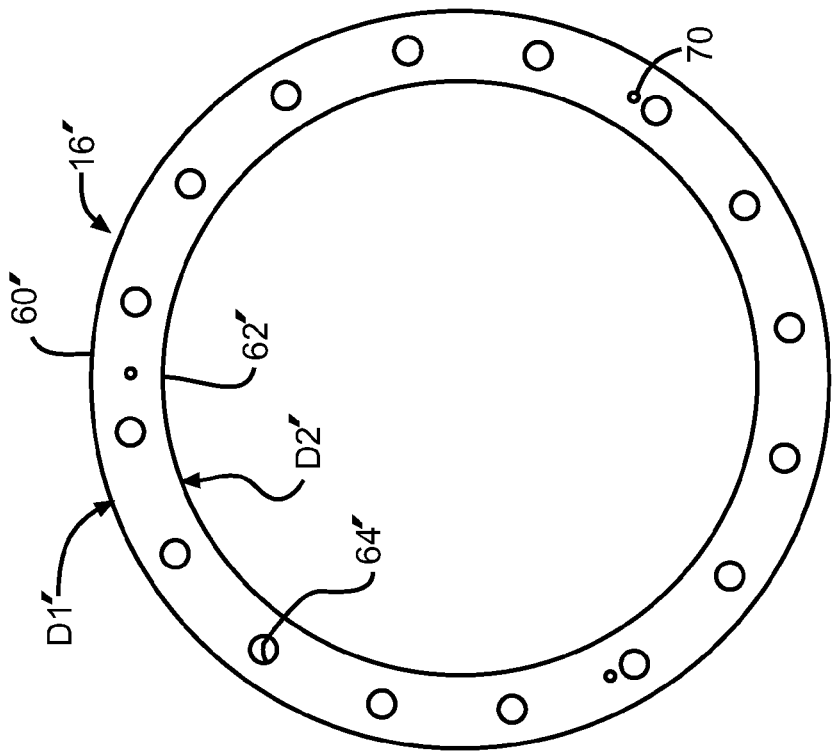
FIG. 2C is a plan view similar to FIG. 2A but showing an alternative embodiment of a seal that can be used in the take-apart vehicle wheel assembly illustrated in FIGS. 1 and 2.
Figure 2A:
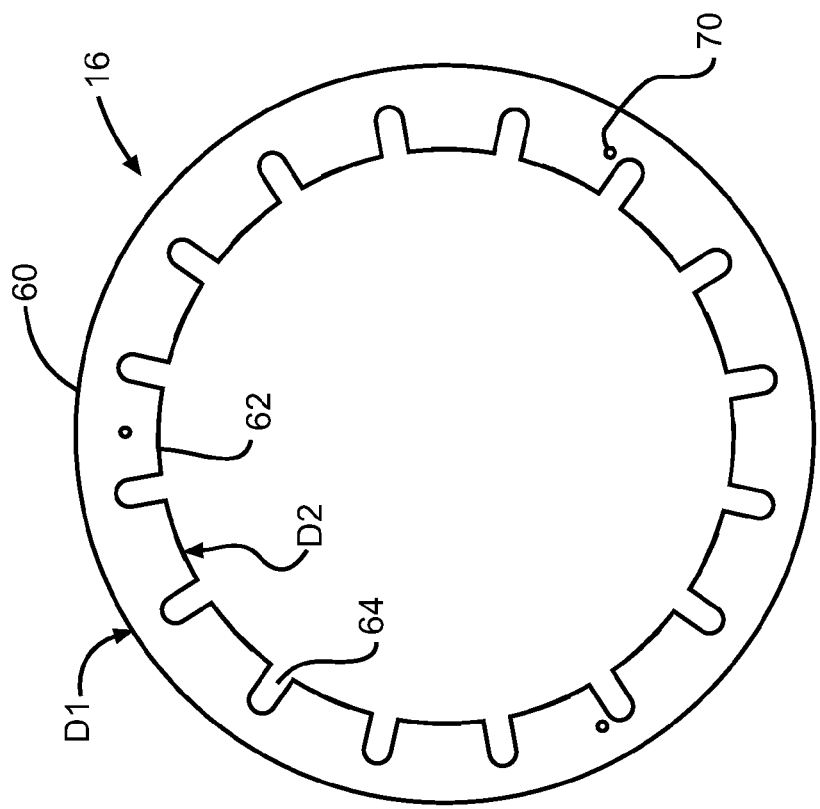
FIG. 2A is a plan view of a seal that can be used in the take-apart vehicle wheel assembly illustrated in FIGS. 1 and 2.

As best shown in FIG. 2A, in the illustrated embodiment the seal 16 is preferably an annular continuous seal which is formed from a suitable material, preferably an elastomeric material, such as for example, rubber, EPDM, nitrile, neoprene, flexible graphite, and silicone. Preferably, as will be discussed below, the material of the seal 16 is selected so that it is compressible and forms a "mechanical" seal that fills the space it is designed for between the inner wheel part 12 and the outer wheel part 14, including any slight irregularities, to prevent air leakage while under compression. In the illustrated embodiment the seal 16 is preferably a generally flat seal having a generally uniform predetermined thickness T. The seal 16 is provided with a continuous or uninterrupted outer peripheral surface 60 and a non-continuous or interrupted inner peripheral surface 62. The outer peripheral surface 60 defines an outer diameter D1 of the seal 16 and an innermost surface of the inner peripheral surface 62 defines an inner diameter D2 of the seal 16.

In the illustrated embodiment, the inner peripheral surface 62 of the seal 16 is provided with a plurality of generally semi-circular or rounded cut-outs or openings 64 formed therein. As can be understood, the number, location and spacing of the openings 64 in the seal 16 generally corresponds to the number, location and spacing of the stud receiving holes 30 provided in the inner annular flange 26 of the inner wheel part 12 and the stud receiving holes 48 provided in the inner annular flange 42 of the outer wheel part 14. As will be discussed below, this enables the studs 50 to be inserted through the aligned holes 30 and 48 of the inner and outer wheel parts 12 and 14, respectively, and also through the openings 64 of the seal 16 so that the nuts 52 can be installed thereon and tightened to secure the inner wheel part 12 and the outer wheel part 14 together with the seal 16 operatively installed and compressed therebetween to produce an air tight seal between the inner wheel part 12 and the outer wheel part 14.

Figure 2B:
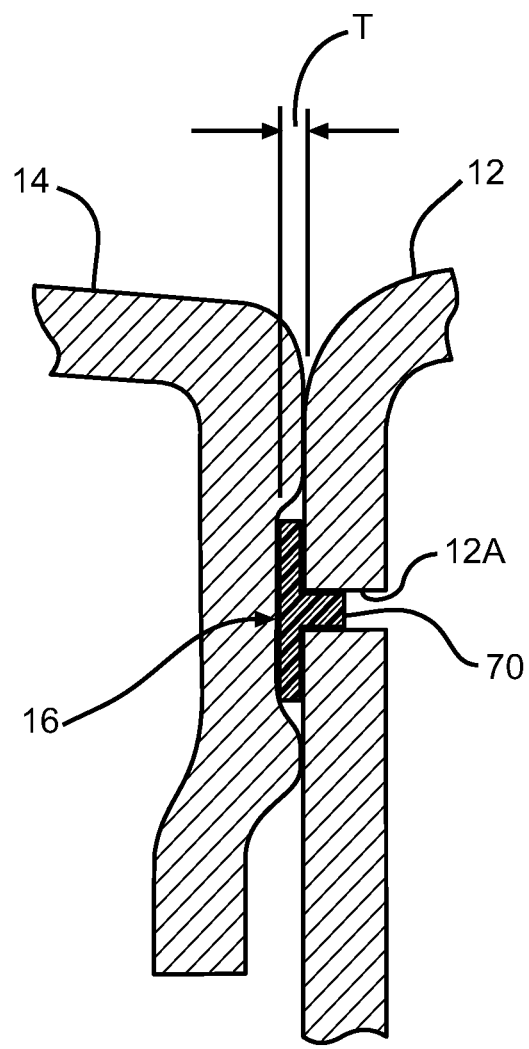
FIG. 2B is an enlarged sectional of a portion of the take-apart vehicle wheel assembly illustrated in FIGS. 1 and 2.

In the illustrated embodiment, the seal 16 is preferably further provided with at least one, or more preferably, with a plurality of tabs or legs 70 formed thereon, one of such tabs 70 best shown in FIG. 2B. In the illustrated embodiment, the seal 16 is preferably provided with at least three of such tabs 70; however, the configuration, number, location and/or construction of the tabs 70 can be other than illustrated and described if so desired. As will be discussed below, the tabs 70 are preferably provided for two purposes, one being to prevent the rotation of the seal 16 during assembly and the other being to provide for the positional control of the seal 16 between the inner wheel part 12 and the outer wheel part 14. Thus, it can be readily understood that the seal 16 be provided with at least two tabs 70 in order to accomplish both of these purposes. Alternatively, the construction and/or the configuration of the seal 16 can be other than illustrated and described, if so desired. For example, the seal 16 can be other than flat (e.g., rounded), the seal 16 can be formed from other suitable elastomeric or non-elastomeric materials, such as for example, metal, mica, cork, felt or a plastic polymer such as Teflon® (PTFE), peek, urethane, or ethylene propylene (EP), and/or the seal 16 can be provided with different kinds or types anti-rotation and/or positional control members, and/or the seal 16 may not be provided with one or both of such control members, if so desired.

For example, FIG. 2C illustrates one example of an alternate embodiment of a seal, indicated generally at 16', which can be used in connection with the present invention. As shown therein, in this embodiment the seal 16' is provided having a continuous or uninterrupted outer peripheral surface 60' and a continuous or uninterrupted inner peripheral surface 62'. The outer peripheral surface 60' defines an outer diameter D1' of the seal 16' and inner peripheral surface 62' defines an inner diameter D2' of the seal 16'. In the illustrated embodiment, the seal 16' is provided with a plurality of holes or openings 64' formed therein. As can be understood, the number, location and spacing of the openings 64' in the seal 16' generally corresponds to the number, location and spacing of the stud receiving holes 30 provided in the inner annular flange 26 of the inner wheel part 12 and the stud receiving holes 48 provided in the inner annular flange 42 of the outer wheel part 14. As a result of this, the studs 50 can be inserted through the aligned holes 30 and 48 of the inner and outer wheel parts 12 and 14, respectively, and also through the openings 64' of the seal 16' so that the nuts 52 can be installed thereon and tightened to secure the inner wheel part 12 and the outer wheel part 14 together with the seal 16' operatively installed and compressed therebetween to produce an air tight seal between the inner wheel part 12 and the outer wheel part 14. Alternatively, the construction and/or the configuration of the seal 16' can be other than illustrated and described if so desired.

Figure 3:
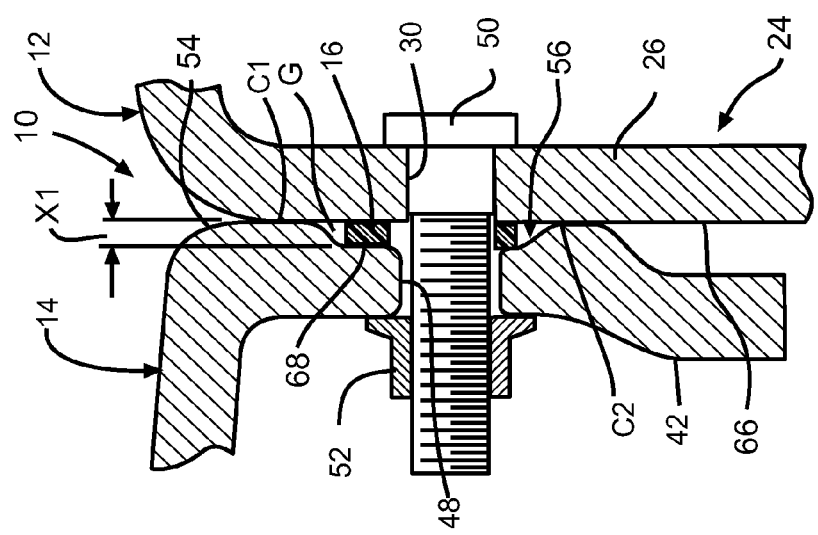
FIG. 3 is an enlarged sectional view of another portion of the take-apart vehicle wheel assembly illustrated in FIGS. 1 and 2.

As best shown in FIG. 3, in the illustrated embodiment the inner annular flange 42 of the outer wheel part 14 includes an inboard surface 54 which is provided with a recess or "sealing gland", indicated generally at 56, formed therein in an area or surface thereof which is adjacently surrounding the stud receiving holes 48 for a purpose to be discussed below. The recess 56 extends axially inwardly relative to the inboard surface 54 a distance X1 and defines a gap G defined between an outer surface 68 of the recess 56 and the outboard surface 66 of the inner wheel part 12. The distance X1 is preferably in the range of from about 3 mm (0.125 in) to about 12 mm (0.5 in) for a purpose to be discussed below. More preferably, the distance X1 is in the range of from about 4 mm (0.157 in) to about 8 mm (0.315 in).

In the illustrated embodiment, the recess 56 is preferably a circumferentially continuously extending recess which extends all the way around the inboard surface 54 of the inner annular flange 42 of the outer wheel part 14 (i.e., three hundred and sixty degrees) so as to define a predetermined cavity or "captive" pocket for operatively receiving the seal 16 therein. Alternatively, the construction and/or the configuration of the recess 56 can be other than illustrated and described if so desired so long as there is a recess 56 provided in the area adjacently surrounding each of the stud receiving holes 48 for a purpose to be discussed below. For example, the recess 56 can be less than continuous such as for example, an individual recess 56 can be provided in the area adjacently surrounding each of the stud receiving holes 48.

As shown in FIG. 3, in the illustrated embodiment the seal 16 is disposed in the recess 56 of the outer wheel part 14 between the inboard surface 54 of the inner annular flange 42 of outer wheel part 14 and an outboard surface 66 of the inner annular flange 26 of the inner wheel part 12. Preferably, as shown in the illustrated embodiment, the seal 16 is only disposed in the portion of the outer wheel part 14 in which the recess 56 is provided. As a result of this, when the nuts 52 are tightened on the studs 50 and torqued to predetermined specifications, the adjacent outboard and inboard surfaces 66 and 54 of the inner wheel part 12 and the outer wheel part 14, respectively, directly engage and contact each other as indicated generally at areas C1 and C2, without any portion of the seal 16 therebetween in these areas. Alternatively, the configuration of one or both of the contact areas C1 and C2 can be other than illustrated if so desired.

Preferably, the normal or "uncompressed" thickness T of the seal 16 is preferably in the range from about 10% to about 35% greater than a gap G defined between the outer surface 68 of the recess 56 and the outboard surface 66 of the inner wheel part 12. However, due to various characteristics of the selected material of the seal 16, such as for example, toughness, hardness, resistance to fluids and/or conditions of operation, such as for example, temperature and pressure, the thickness T of the seal 16 relative to the gap G can be other than illustrated if so desired. For example, if the seal 16 is formed from nitrile rubber (NBR), which has a good toughness and range of temperature comparatively, then the normal or uncompressed thickness T of the seal 16 can be in the range of from about 15% to about 25% greater than the gap G defined between the outer surface 68 of the recess 56 and the outboard surface 66 of the inner wheel part 12. As a result of this, when the inner wheel part 12 and the outer wheel part 14 are secured together by the studs 50 and nuts 52, there is a sufficient amount of the material of the seal 16 to be compressed therebetween to provide a reliable air tight compression seal between the inner and outer wheel parts 12 and 14, respectively.

Also, as shown in FIG. 2B, in the illustrated embodiment during assembly the tabs 70 provided on the seal 16 are preferably disposed in holes 12A which, in the illustrated embodiment are provided in the inner wheel part 12 in order to position the seal 16 in the recess 56 in a predetermined axial direction or orientation. Also, since the tabs 70 on the seal 16 are disposed in the holes 12A provided in the inner wheel part 12, this reduces or prevents the rotation of the seal 16 in the recess 56 during the assembly process in which the studs 50 and nuts 52 are installed. Alternatively, other means or members can be used to secure and/or position the seal 16 in the recess 56 and/or to prevent the rotation of the seal 16 in the recess 56 during assembly. For example, an adhesive or similar material can be used to hold, position and/or prevent rotation of the seal 16 in the recess 56 during assembly. The adhesive or similar material can be selectively applied to the seal 16 and/or the adjacent surface of one or both of the inner wheel part 12 and/or the outer wheel part 14 if so desired. Also, while the seal 16 is preferably oriented in the axial direction in the recess 56 for subsequent assembly of the respective inner and outer wheel parts 12 and 14 also in the axial direction, the orientation of the seal 16 and the inner and outer wheel parts 12 and 14 can be other than described, such as for example, in the radial direction, if so desired. Alternatively, the construction and/or the configuration of one or more of the inner wheel part 12, the outer wheel part 14 and/or the seal 16 of the first embodiment of the take-apart vehicle wheel assembly 10 can be other than illustrated described herein if so desired.

Figure 4:
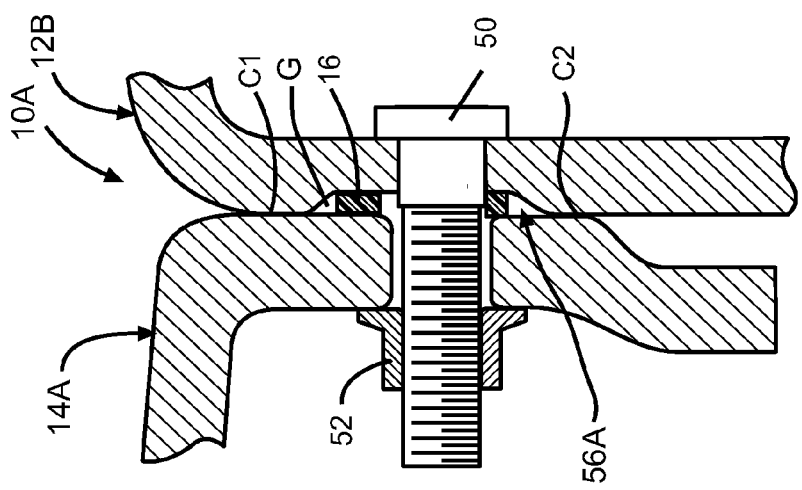
FIG. 4 is an enlarged sectional view similar to FIG. 3 showing a portion of a second embodiment of a take-apart vehicle wheel assembly constructed in accordance with this invention.

Referring now to FIG. 4 and using like reference numbers to indicate corresponding parts, there is illustrated an enlarged sectional view similar to FIG. 3 showing a portion of a second embodiment of a take-apart vehicle wheel assembly, indicated generally at 10A, constructed in accordance with this invention. As shown therein, in this embodiment an inner wheel part 12B is provided with a recess, generally indicated at 56A, formed therein instead of the outer wheel part 14 having the recess 56 as shown in connection with the first of the take-apart vehicle wheel assembly 10. In this embodiment, the recess 56A can be similar in construction and/or configuration to the recess 56 to enable the seal 16 to be used without any modification thereto, if so desired. Alternatively, the construction and/or the configuration of the take-apart vehicle wheel assembly 10A can be other than illustrated and described if so desired.

Figure 5:
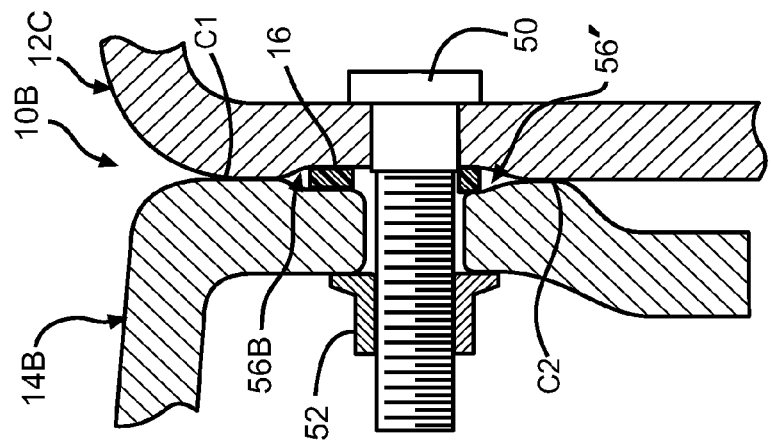
FIG. 5 is an enlarged sectional view similar to FIG. 3 showing a portion of a third embodiment of a take-apart vehicle wheel assembly constructed in accordance with this invention.

Referring now to FIG. 5 and using like reference numbers to indicate corresponding parts, there is illustrated an enlarged sectional view similar to FIG. 3 showing a portion of a third embodiment of a take-apart vehicle wheel assembly, indicated generally at 10B, constructed in accordance with this invention. As shown therein, in this embodiment in addition to an outer wheel part 14B being provided with a recess 56', an inner wheel part 12C is also provided with a recess, indicated generally at 56B, formed therein. Preferably, in this embodiment the recesses 56' and 56B define respective gaps therein which when combined is about the same as the gap G defined by the recess 56 provided in the outer wheel part 14 shown in connection with the first embodiment of the take-apart vehicle wheel assembly 10. This enables the seal 16 to be used in this embodiment without any modification thereto, if so desired. Alternatively, the construction and/or the configuration of the take-apart vehicle wheel assembly 10B can be other than illustrated and described if so desired.

Figure 6:
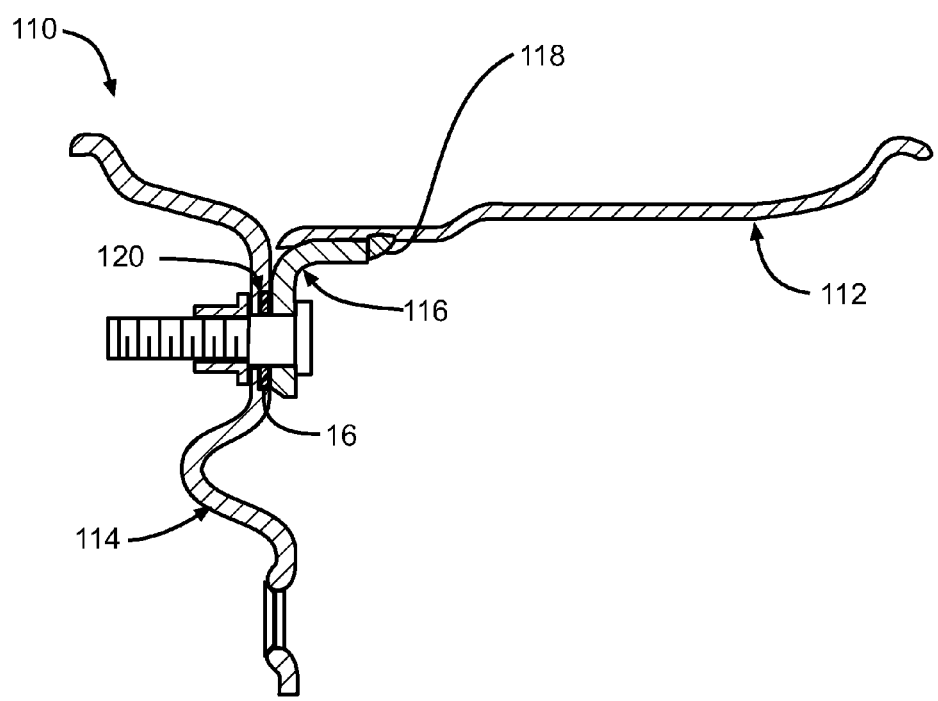
FIG. 6 is a sectional view of a fourth embodiment of a take-apart vehicle wheel assembly constructed in accordance with this invention.

Referring now to FIG. 6 and using like reference numbers to indicate corresponding parts, there is illustrated a sectional view of a fourth embodiment of a take-apart vehicle wheel assembly, indicated generally at 110, constructed in accordance with this invention. As shown in FIG. 6, the take-apart vehicle wheel assembly 110 includes an inner rim or first wheel part 112 (two pieces welded together) and a combination outer rim-wheel mounting disc or second wheel part 114 (single piece no weld). In this embodiment, the first wheel part 112 includes a clamp ring or third wheel part 116 secured thereto by a weld 118. As shown in this embodiment, the second wheel part 114 is provided with a recess, indicated generally at 120, which is similar in construction and/or configuration to the recess 56 of the first embodiment of the take-apart vehicle wheel assembly 10 to enable the seal 16 to be used without any modification thereto. Alternatively, the construction and/or the configuration of the take-apart vehicle wheel assembly 110 can be other than illustrated and described if so desired. For example, the take-apart vehicle wheel assembly 110 can have a recess or recesses provided therein which are similar to those shown in connection with the embodiments of FIGS. 3, 4 and/or 5.

Figure 7:
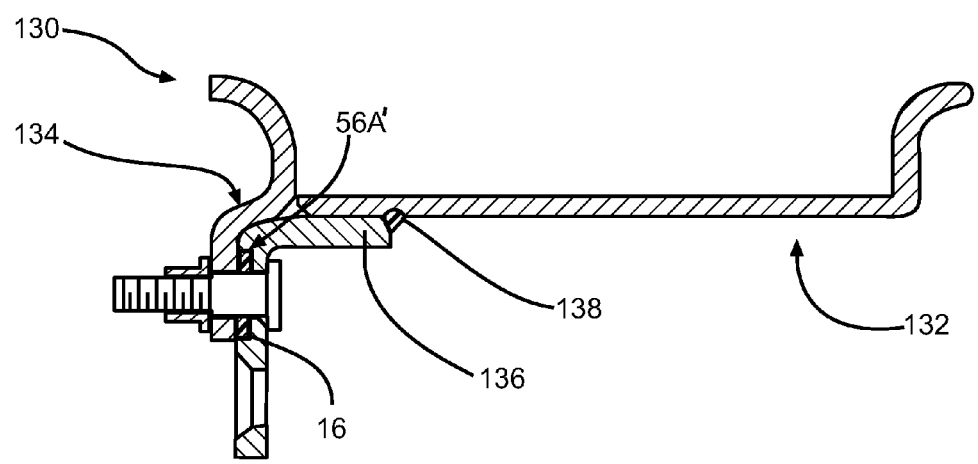
FIG. 7 is a sectional view of a fifth embodiment of a take-apart vehicle wheel assembly constructed in accordance with this invention.

Referring now to FIG. 7 and using like reference numbers to indicate corresponding parts, there is illustrated a sectional view of a fifth embodiment of a take-apart vehicle wheel assembly, indicated generally at 130, constructed in accordance with this invention. As shown in FIG. 7, the take-apart vehicle wheel assembly 130 includes a combination inner rim-wheel mounting disc or first wheel part 132 (two pieces welded together) and an outer rim or second wheel part 134 (single piece no weld). In this embodiment, the first wheel part 132 includes a wheel mounting disc or third wheel part 136 secured thereto by a weld 138. As shown in this embodiment, the first wheel part 132 is provided with a recess, indicated generally at 56A', which is similar in construction and/or configuration to the recess 56A of the second embodiment of the take-apart vehicle wheel assembly 10A shown in FIG. 4, to enable the seal 16 to be used herein without any modification thereto. Alternatively, the construction and/or the configuration of the take-apart vehicle wheel assembly 130 can be other than illustrated and described if so desired. For example, the take-apart vehicle wheel assembly 130 can have a recess or recesses provided therein which are similar to those shown in connection with the embodiments of FIGS. 3, 4 and/or 5.

Figure 8:
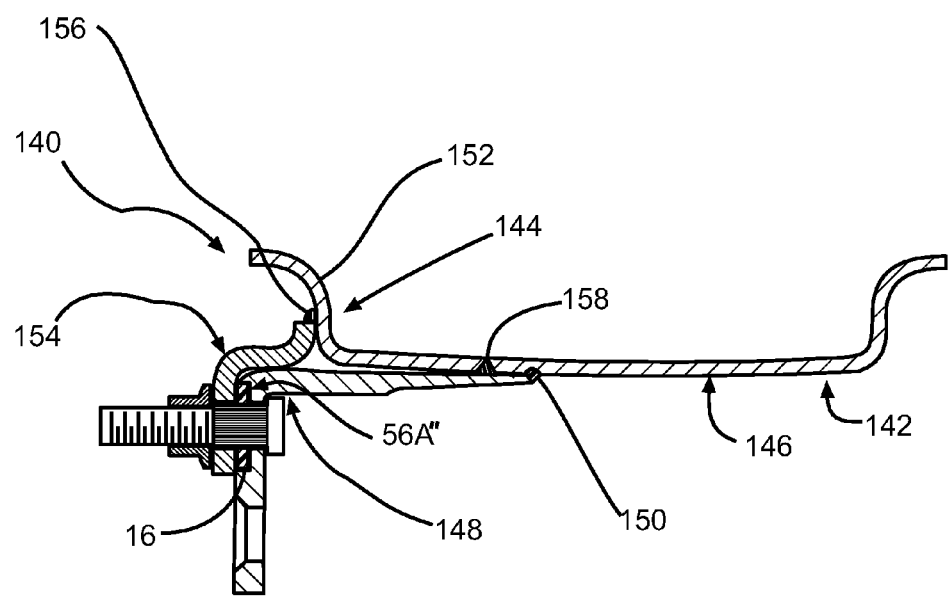
FIG. 8 is a sectional view of a sixth embodiment of a take-apart vehicle wheel assembly constructed in accordance with this invention.

Referring now to FIG. 8 and using like reference numbers to indicate corresponding parts, there is illustrated a sectional view of a sixth embodiment of a take-apart vehicle wheel assembly, indicated generally at 140, constructed in accordance with this invention. As shown in FIG. 8, the take-apart vehicle wheel assembly 140 includes a combination inner rim-wheel mounting disc or first wheel part 142 (two pieces welded together) and a combination outer rim-clamp ring or second wheel part 144 (two pieces welded together). In this embodiment, the first wheel part 142 includes an inner rim part 146 and a mounting disc part 148 secured thereto by a weld 150. The second wheel part 144 includes an outer rim part 152 and a clamp ring part 154 secured thereto by a weld 156. As shown in this embodiment, the clamp ring part 154 of the second wheel part 144 is provided with a recess, indicated generally at 56A", which is similar in construction and/or configuration to the recess 56A of the second embodiment of the take-apart vehicle wheel assembly 10A shown in FIG. 4, to enable the seal 16 to be used herein without any modification thereto. In addition, in this embodiment, the take-apart vehicle wheel assembly 140 can also include a seal 158 disposed in a space formed between adjacent surfaces of the inner rim part 146, the outer rim part 152 and the disc part 148 as shown in FIG. 8; however, with the seal 16 being provided as the "primary" seal for sealing purposes, the seal 158 could be provided as a "secondary" seal or could be eliminated if so desired in this embodiment. Alternatively, the construction and/or the configuration of the take-apart vehicle wheel assembly 140 can be other than illustrated and described if so desired. For example, the take-apart vehicle wheel assembly 140 can have a recess or recesses provided therein which are similar to those shown in connection with the embodiments of FIGS. 3, 4 and/or 5.

Figure 9:
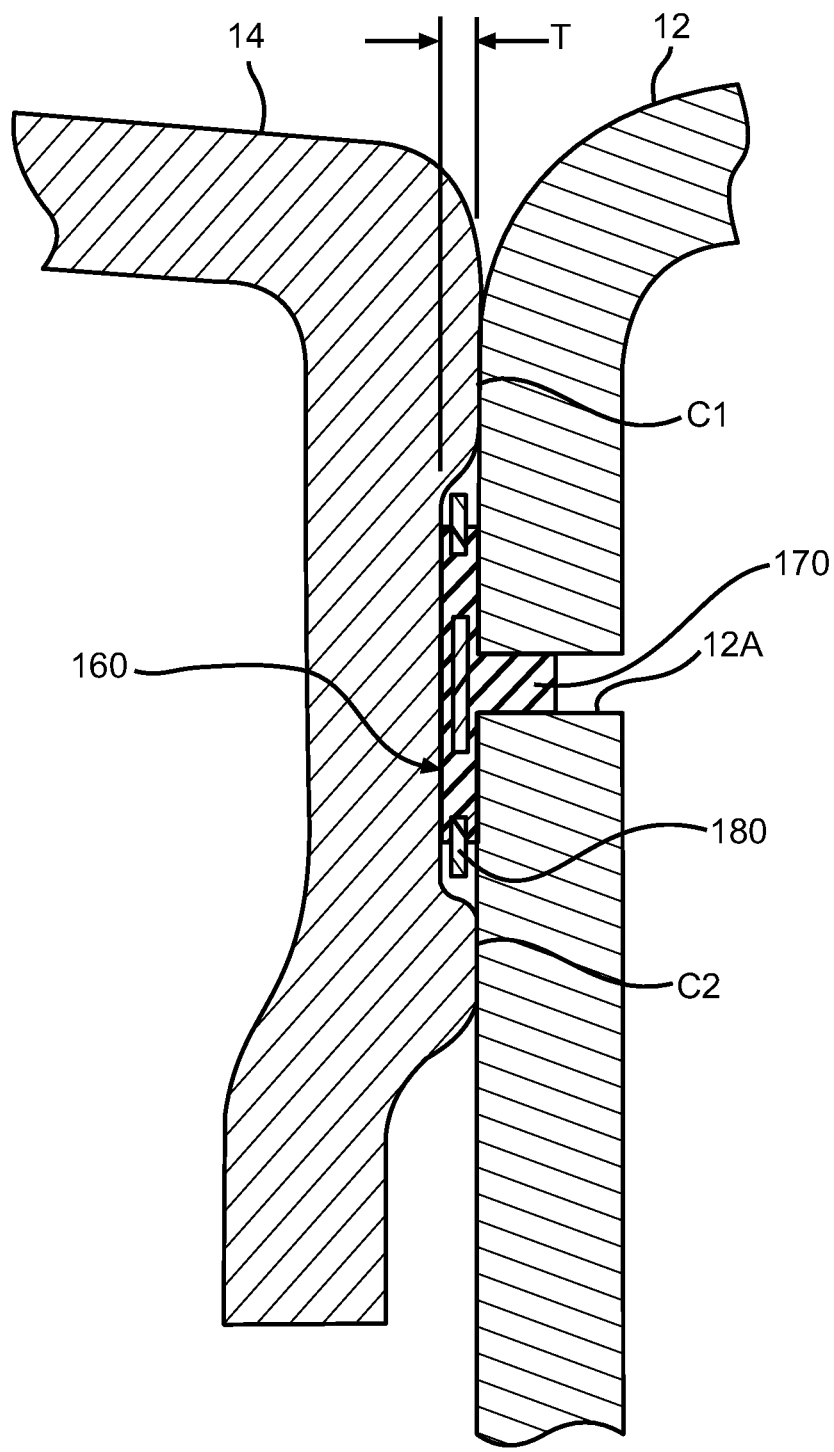
FIG. 9 is an enlarged sectional view showing another alternative embodiment of a seal that can be used in the take-apart vehicle wheel assembly illustrated in FIGS. 1 and 2.
Figure 10:
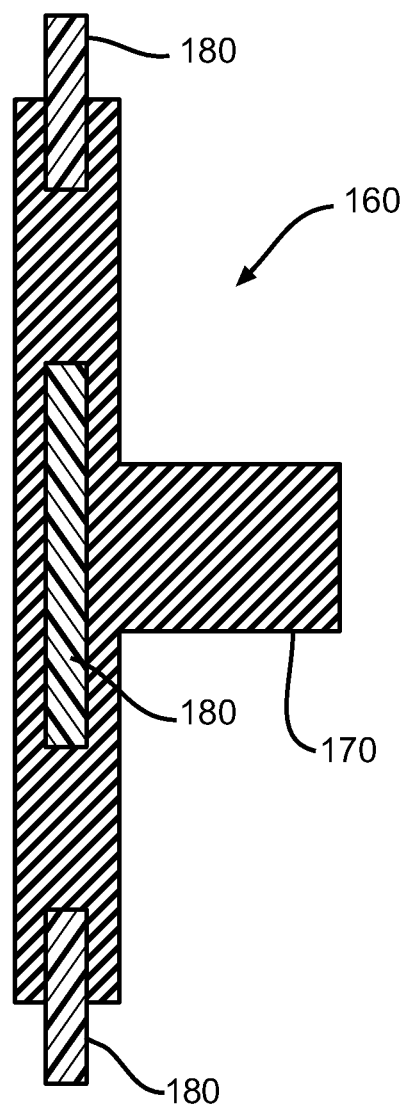
FIG. 10 is a sectional view of the seal illustrated in FIG. 9.

Referring now to FIG. 9 and using like reference numbers to indicate corresponding parts, there is illustrated an enlarged sectional view showing another alternative embodiment of a seal, indicated generally at 160, that can be used in the take-apart vehicle wheel assembly illustrated in FIGS. 1 and 2. As shown in this embodiment best in FIG. 10, the seal 160 preferably includes a plurality of tabs or legs 170 formed thereon and at least one generally non-compressible or "reinforcement" members 180. In the illustrated embodiment, the seal 160 is provided with three of such members 180 although less than three members 180 can be provided in the seal 160 if so desired. For example, the seal 160 can include any combination only one or two of such members 180.

Figure 11:
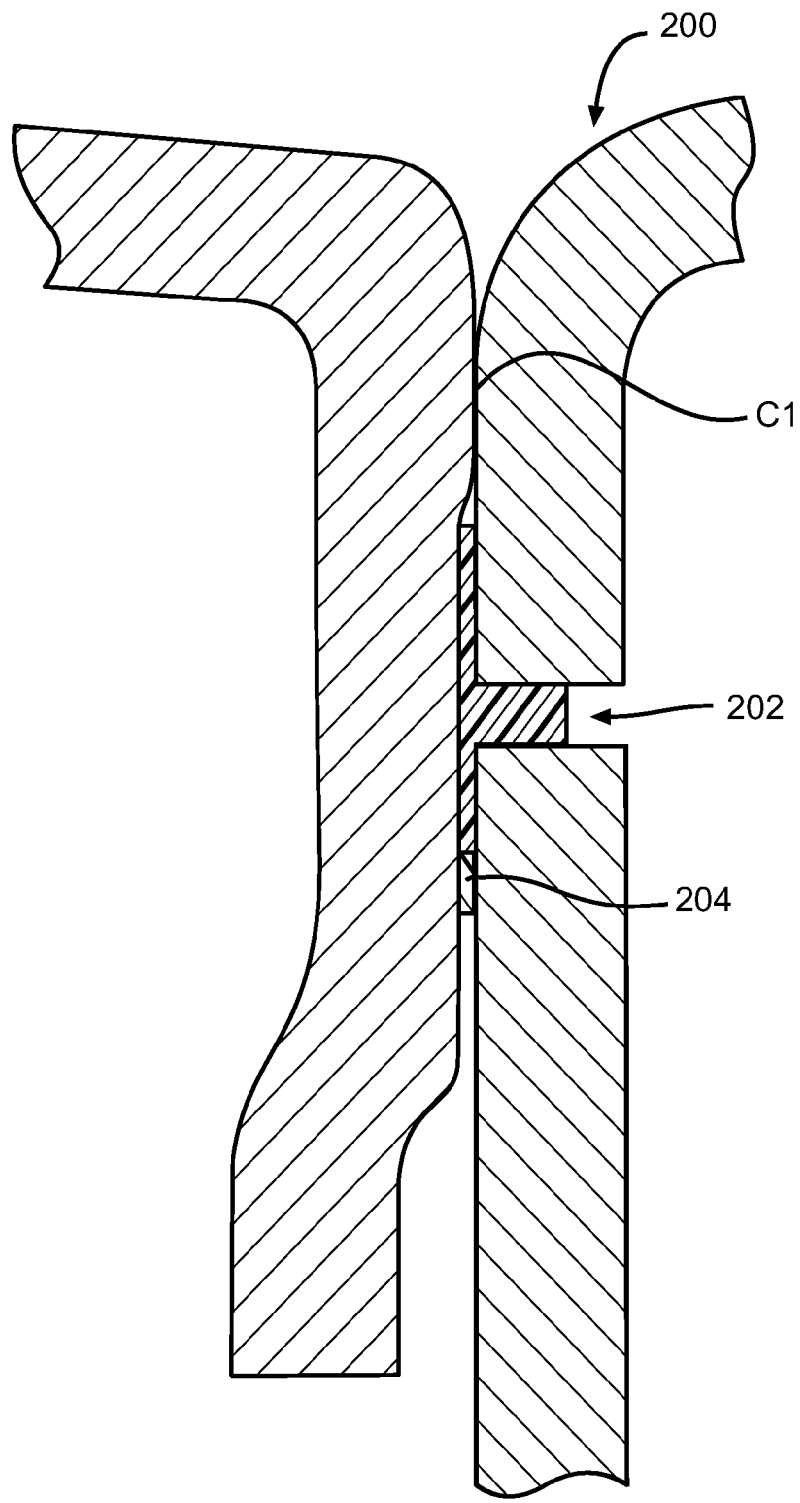
FIG. 11 is an enlarged sectional of a seventh embodiment of a take-apart vehicle wheel assembly constructed in accordance with this invention.
Figure 12:
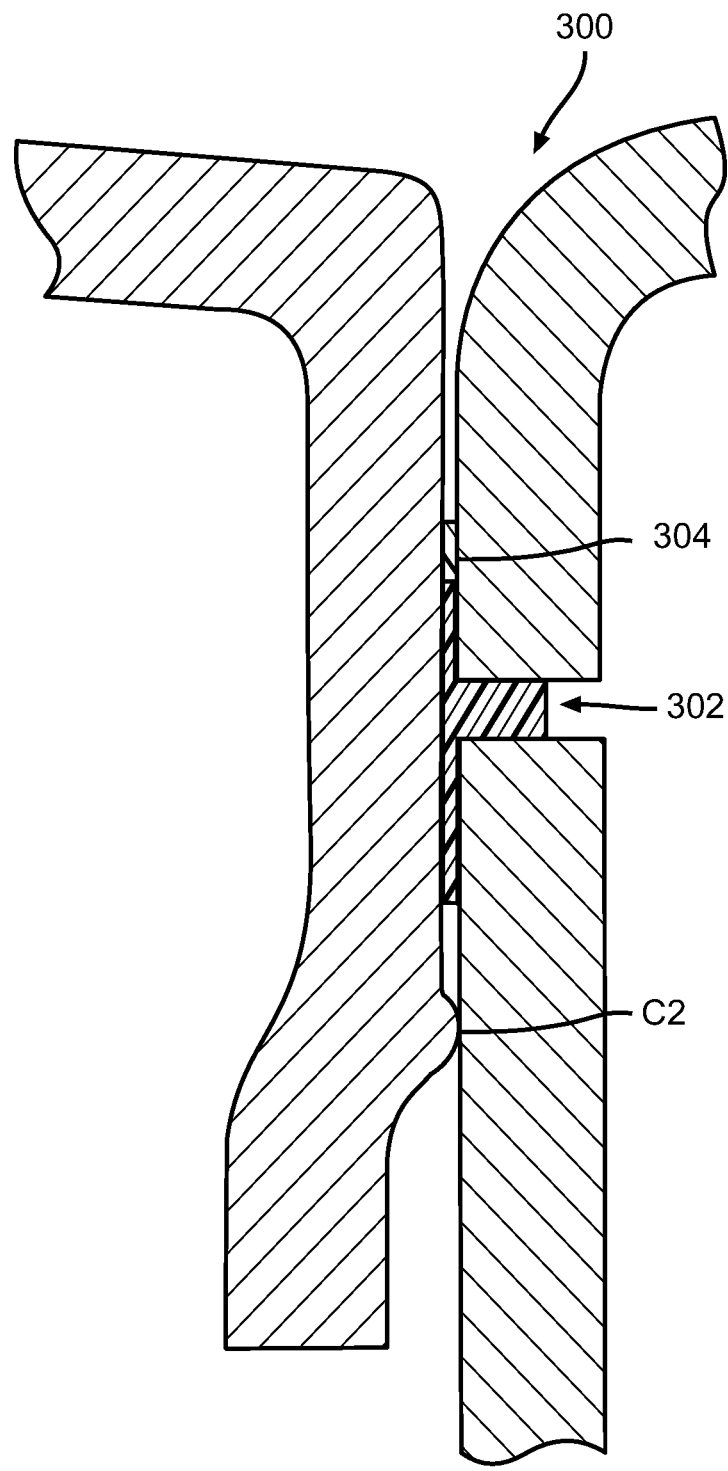
FIG. 12 is an enlarged sectional view of an eighth embodiment of a take-apart vehicle wheel assembly constructed in accordance with this invention.

Preferably, the members 180 are continuous members and are molded or secured in-situ in the seal 160 during the manufacturing process of forming the seal 160. Preferably, the members 180 are formed from a generally non-compressible material, such as for example hard plastic or metal. Thus, the members 180 can be effective to add rigidity to the seal 160 and also one or more of the members 180 can be configured to be effective to prevent overtightening of the associated studs 50 and nuts 52 during assembly. For example, as shown in the embodiment of a portion of an alternate construction of a wheel, indicated generally at 200 in FIG. 11, a seal 202 is provided in which a "lower" member 204 of the seal 202 is configured to be effective to prevent overtightening of the associated studs 50 and nuts 52 during assembly by acting as a stop between adjacent surfaces of the wheel. Similarly, as shown in the embodiment of a portion of an alternate construction of a wheel, indicated generally at 300 in FIG. 12, a seal 302 is provided in which an "upper" member 304 of the seal 302 is configured to be effective to prevent overtightening of the associated studs 50 and nuts 52 during assembly by acting as a stop between adjacent surfaces of the wheel. Alternatively, the number, configuration, size, location and/or material of the seal 160, 202 and/or 302, including one or more of its associated members 180, 204, 304, respectively, can be other than illustrated and described if so desired.

One potential advantage of the present invention is that operatively disposing the seal in the recess(es) of the associated wheel part(s) can increase the total amount of the surface area of the associated sealing that occurs between the inner and outer wheel parts thereof compared to that typically provided by a conventional o-ring seal. Another potential advantage of the present invention is that the seal can be more robust in installation performance and in time in service and/or more forgiving with respect to manufacturing variations in the inner and outer wheel parts due to the gland design and the positioning and compression in the axial direction of the seal compared to that typically provided by a conventional o-ring seal. Still a further potential advantage of the present invention is that the seal being operatively disposed in the recess (es) of the associated wheel part(s) can improve the interface surfaces or areas of the associated wheel part(s) which can help protect the seal during installation from being damaged and/or improperly installed such as can occur from the surfaces having sharp edges and/or the seal being pinched during installation, compared to that typically provided by a conventional o-ring seal. Yet a further potential advantage of the present invention is that the seal can potentially be a reusable component.

The principle and mode of operation of this invention have been described in its various embodiments. However, it should be noted that this invention may be practiced otherwise than as specifically illustrated and described without departing from its scope.

What is claimed is:
1. A take-apart vehicle wheel assembly comprising:
an inner wheel part defining an axis and including a generally radially extending annular flange having an outboard surface, the radially extending annular flange of the inner wheel part having a plurality of stud receiving holes formed therein;
an outer wheel part configured to be secured to the inner wheel part, the outer wheel part including a generally radially extending annular flange having an inboard surface, the radially extending annular flange of the outer wheel part having a plurality of stud receiving holes formed therein;
a gap defined between the outboard surface of the inner wheel part and the inboard surface of the outer wheel part in an area adjacently surrounding each of the plurality of stud receiving holes formed therein; and a seal disposed in the gap whereby when the inner wheel part and the outer wheel part are secured together using studs and nuts the seal is operative to produce a seal between the inner wheel part and the outer wheel part;

wherein the gap is formed by providing a recess in at least one of the outboard surface of the inner wheel part and the inboard surface of the outer wheel part in at least a portion of the area adjacently surrounding each of the plurality of stud receiving holes formed therein;

wherein at least one of the inner wheel part and the outer wheel part includes at least two openings provided therein; and wherein the seal includes at least two axially extending tabs provided thereon which are disposed in the openings and configured for at least one of anti-rotation and positional control thereof.

2. The take-apart vehicle wheel assembly of claim 1 wherein the gap is formed by providing a recess in the outboard surface of the inner wheel part.

3. The take-apart vehicle wheel assembly of claim 1 wherein the gap is formed by providing a recess in the inboard surface of the outer wheel part.

4. The take-apart vehicle wheel assembly of claim 1 wherein the gap is formed by providing a recess in both the outboard surface of the inner wheel part and the inboard surface of the outer wheel part.

5. The take-apart vehicle wheel assembly of claim 1 wherein the seal is provided with a continuous and uninterrupted outer peripheral surface and a continuous inner peripheral surface, the outer peripheral surface defining an outer diameter of the seal and an innermost surface of the inner peripheral surface defining an inner diameter of the seal, and wherein the inner peripheral surface of the seal is provided with a plurality of generally semi-circular openings formed therein.

6. The take-apart vehicle wheel assembly of claim 1 wherein the seal is provided with a continuous and uninterrupted outer peripheral surface and a continuous and uninterrupted inner peripheral surface, the outer peripheral surface defining an outer diameter of the seal and the inner peripheral surface defining an inner diameter of the seal, and wherein the inner peripheral surface of the seal is provided with a plurality of openings formed therein.

7. The take-apart vehicle wheel assembly of claim 1 wherein the inner wheel part is a single piece and the outer wheel part is a single piece.

8. The take-apart vehicle wheel assembly of claim 1 wherein one of the inner wheel part and the outer wheel part is a single piece and the other one of the inner wheel part and the outer wheel parts includes two pieces joined together by welding.

9. The take-apart vehicle wheel assembly of claim 1 wherein the inner wheel part and the outer wheel part include two pieces joined together by welding.

10. The take-apart vehicle wheel assembly of claim 1 wherein the seal is formed from a generally compressible material and includes at least one generally non-compressible member secured thereto.

11. A take-apart vehicle wheel assembly comprising:

an inner wheel part defining an axis and including a generally radially extending annular flange having an outboard surface, the radially extending annular flange of the inner wheel part having a plurality of stud receiving holes formed therein;

an outer wheel part configured to be secured to the inner wheel part, the outer wheel part including a generally radially extending annular flange having an inboard surface, the radially extending annular flange of the outer wheel part having a plurality of stud receiving holes formed therein;

a gap defined between the outboard surface of the inner wheel part and the inboard surface of the outer wheel part in an area adjacently surrounding each of the plurality of stud receiving holes formed therein;

a seal disposed in the gap whereby when the inner wheel part and the outer wheel part are secured together the seal is operative to produce a seal between the inner wheel part and the outer wheel part, the seal provided with a plurality of openings formed therein; and a stud extending through a respective one of each of the plurality of stud receiving holes formed in the inner wheel part and the outer wheel part and through a respective one of each of the plurality of openings provided in the seal and having nuts installed thereon to secure the inner wheel part and the outer wheel part together with the seal disposed in the gap;

wherein the gap is formed by providing a recess in at least one of the outboard surface of the inner wheel part and the inboard surface of the outer wheel part in at least a portion of the area adjacently surrounding each of the plurality of stud receiving holes formed therein;

wherein at least one of the inner wheel part and the outer wheel part includes at least two openings provided therein; and wherein the seal includes at least two axially extending tabs provided thereon which are disposed in the openings and configured for at least one of anti-rotation and positional control thereof.

12. The take-apart vehicle wheel assembly of claim 11 wherein the gap is formed by providing a recess in the outboard surface of the inner wheel part.

13. The take-apart vehicle wheel assembly of claim 11 wherein the gap is formed by providing a recess in the inboard surface of the outer wheel part.

14. The take-apart vehicle wheel assembly of claim 11 wherein the gap is formed by providing a recess in both the outboard surface of the inner wheel part and the inboard surface of the outer wheel part.

15. The take-apart vehicle wheel assembly of claim 11 wherein the seal is provided with a continuous and uninterrupted outer peripheral surface and a continuous inner peripheral surface, the outer peripheral surface defining an outer diameter of the seal and an innermost surface of the inner peripheral surface defining an inner diameter of the seal, and wherein the inner peripheral surface of the seal is provided with a plurality of generally semi-circular openings formed therein.

16. The take-apart vehicle wheel assembly of claim 11 wherein the seal is provided with a continuous and uninterrupted outer peripheral surface and a continuous and uninterrupted inner peripheral surface, the outer peripheral surface defining an outer diameter of the seal and the inner peripheral surface defining an inner diameter of the seal, and wherein the inner peripheral surface of the seal is provided with a plurality of openings formed therein.

17. The take-apart vehicle wheel assembly of claim 11 wherein the inner wheel part is a single piece and the outer wheel part is a single piece.

18. The take-apart vehicle wheel assembly of claim 11 wherein one of the inner wheel part and the outer wheel part is a single piece and the other one of the inner wheel part and the outer wheel parts includes two pieces joined together by welding.

19. The take-apart vehicle wheel assembly of claim 11 wherein the inner wheel part and the outer wheel part include two pieces joined together by welding.

20. The take-apart vehicle wheel assembly of claim 11 wherein the seal is formed from a generally compressible material and includes at least one generally non-compressible member secured thereto.

21. A seal adapted for use in a take-apart vehicle wheel assembly comprising:
   an annular and continuous seal formed from a suitable material and including an outer peripheral surface, an inner peripheral surface, and a plurality of openings formed therein, wherein the seal is generally flat and defines a predetermined thickness, and wherein the seal includes at least two axially extending tabs provided thereon which are configured to be disposed in at least two opening provided in a component of the wheel assembly and configured for at least one of anti-rotation and positional control thereof.

22. The seal of claim 21 wherein seal is provided with a continuous and uninterrupted outer peripheral surface and a continuous inner peripheral surface, the outer peripheral surface defining an outer diameter of the seal and an innermost surface of the inner peripheral surface defining an inner diameter of the seal, and wherein the inner peripheral surface of the seal is provided with a plurality of generally semi-circular openings formed therein.

23. The seal of claim 21 wherein the seal is provided with a continuous and uninterrupted outer peripheral surface and a continuous and uninterrupted inner peripheral surface, the outer peripheral surface defining an outer diameter of the seal and the inner peripheral surface defining an inner diameter of the seal, and wherein the inner peripheral surface of the seal is provided with a plurality of openings formed therein.

24. The seal of claim 21 wherein the seal is formed from a generally compressible material and includes at least one generally non-compressible member secured thereto.

25. A method for producing a take-apart vehicle wheel assembly comprising the steps of:
   (a) providing an inner wheel part defining an axis and including a generally radially extending annular flange having an outboard surface, the radially extending annular flange of the inner wheel part having a plurality of stud receiving holes formed therein;
   (b) providing an outer wheel part configured to be secured to the inner wheel part, the outer wheel part including a generally radially extending annular flange having an inboard surface, the radially extending annular flange of the outer wheel part having a plurality of stud receiving holes formed therein;
   (c) providing a seal adapted to be disposed in a gap defined between the outboard surface of the inner wheel part and the inboard surface of the outer wheel part in an area adjacently surrounding each of the plurality of stud receiving holes formed therein, the seal provided with a plurality of openings formed therein and at least two axially extending tabs provided thereon and configured for at least one of anti-rotation and positional control thereof;
   (d) positioning the inner wheel part and the outer wheel part adjacent to each other to define the gap;
   (e) positioning the seal in the gap which includes disposing the tabs in openings provided in at least one of the inner wheel part and the outer wheel part; and
   (f) securing the inner wheel part and the outer wheel part together by installing a stud which extends through a respective one of each of the plurality of stud receiving holes formed in the inner wheel part and the outer wheel part and through a respective one of each of the plurality of openings provided in the seal and installing a nut on each of the studs to thereby secure the inner wheel part and the outer wheel part together with the seal disposed in the gap thereby producing a seal between the inner wheel part and the outer wheel part.

\* \* \* \* \*